United States Patent [19]

Proctor et al.

[11] Patent Number: 5,793,509
[45] Date of Patent: Aug. 11, 1998

[54] TELECOMMUNICATIONS NETWORK

[75] Inventors: Richard John Proctor; Thomas Slade Maddern, both of Dorset, Great Britain

[73] Assignee: GPT Limited, United Kingdom

[21] Appl. No.: 498,426

[22] Filed: Jul. 5, 1995

[30] Foreign Application Priority Data

Jul. 7, 1994 [GB] United Kingdom ............... 9413716
Sep. 12, 1994 [GB] United Kingdom ............... 9418349

[51] Int. Cl.⁶ ........................................ H04J 14/08
[52] U.S. Cl. ........................ 359/136; 359/137; 371/37.7
[58] Field of Search ............................... 359/110, 135, 359/136, 137, 167; 370/93, 95.3, 347; 371/5.1, 8.2, 16.5, 29.1, 37.7

[56] References Cited

U.S. PATENT DOCUMENTS

| | | | |
|---|---|---|---|
| 4,633,646 | 1/1987 | Anderson | 370/111 |
| 5,210,751 | 5/1993 | Onoe et al. | 370/94.1 |
| 5,341,365 | 8/1994 | Claree | 359/136 |
| 5,367,394 | 11/1994 | Chuter et al. | 359/110 |

FOREIGN PATENT DOCUMENTS 2007431 4/1992 WIPO ............... 359/136

*Primary Examiner*—Kinfe-Michael Negash
*Attorney, Agent, or Firm*—Kirschstein et al.

[57] ABSTRACT

In a telecommunications time division multiple (TDMA) optic network system, network termination equipments (NTE's) are enabled to communicate with a head end by the NTE encoding a message as a signal including error correction on the existing signal traffic, monitoring the errors at the head end and extracting the message from the errors.

6 Claims, 1 Drawing Sheet

TELECOMMUNICATIONS NETWORK

BACKGROUND OF THE INVENTION

The present invention refers to copending British Patent Applications Nos. GB9413716.3 and GB9418354.8, both entitled "Telecommunications Network" which are both imported herein by reference and is also related to co-pending U.S. patent application Ser. No. 08/498,427, filed Jul. 5, 1995.

The present application relates to an alternative procedure for ranging a Network Termination Equipment (NTE) across a network, for example an optical network, such as that described in Application No. GB9413716.3. That application described the use of a separate carrier for the ranging operation.

Further, though the invention is described in connection with a ranging operation, the method can be used to send any message on a Time Division Multiple Access (TDMA) system from an NTE to the head end.

The term Network Termination (NT) in the above referenced earlier application has been replaced in the present application by Network Termination Equipment (NTE). It should be realized that the two terms are interchangeable in the context of these applications.

SUMMARY OF THE INVENTION

According to the present invention there is now provided in a telecommunications time division multiple access (TDMA) optic network system a method of enabling network termination equipment (NTEs) to communicate with a head end, the method comprising the NTE encoding a message as a signal including error connection on the existing signal traffic and monitoring the errors at the head end and extracting the message from the errors.

DETAILED DESCRIPTION

Figure 2:
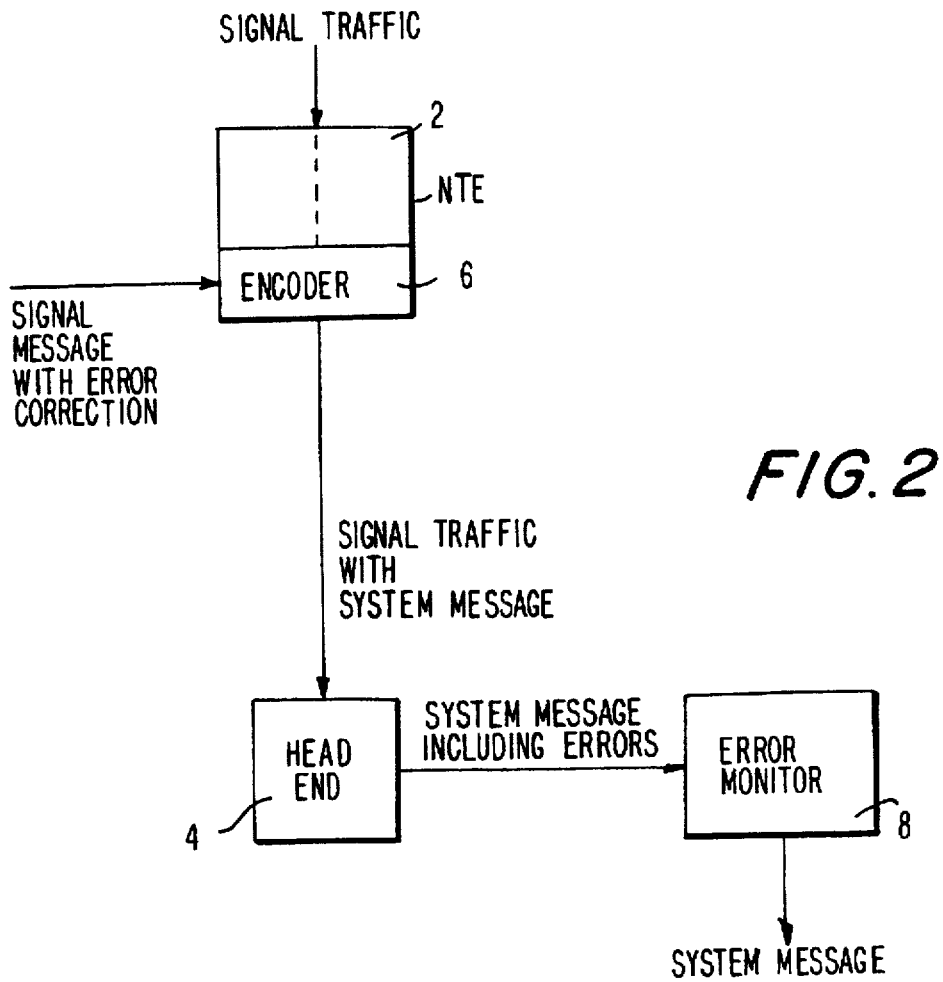
FIG. 2 is a block diagram depicting the extraction of an encoded system message from errors at the head end of the network of FIG. 1.
Figure 1:
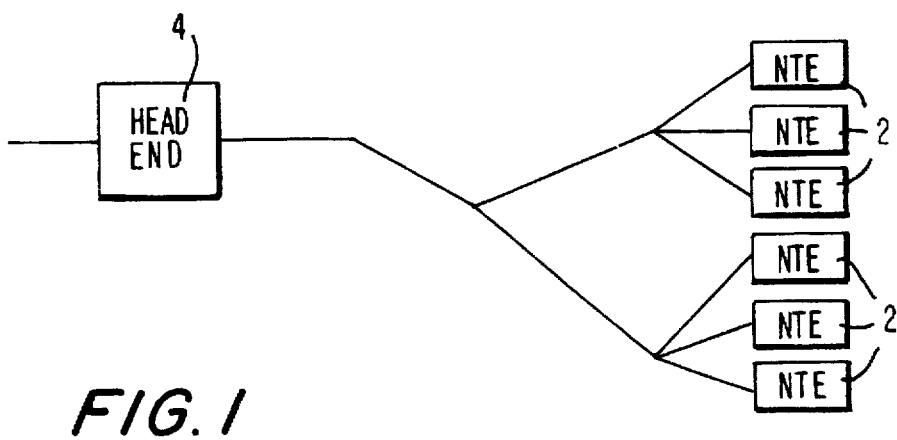
FIG. 1 is a block diagram showing the interconnection among the NTEs and the head end in a TDMA network.

The present invention will now be described by way of example.

Controlled error coding can be used to allow initialized NTEs 2 to communicate with the head end 4 without affecting the other traffic. This communication will identify an NTE and allow the head end to determine its range.

The NTE needs to send a small indication to the head end when it is initially powered on. The NTEs operate in a TDMA system and until the NTE knows its range any attempt to communicate with the head end will corrupt live traffic.

Due to the large range of distances involved it is not possible to identify a quiet time to communicate or to do the ranging.

The system described in Application No. GB9413716.3 used a separate sub carrier to perform this, this option proved difficult to implement for other reasons and a pure TDMA system resulted.

The initial ranging will operate in the following way:

In a response to a "Any New NTEs" signal from the head end the NTE will encode at block 6 a slow speed signal on to the live running traffic (typically 100 Kbit/s as compared with the normal data rate of 700 Mbit/s). The upstream cells will have error correction sufficient to correct up to 2 consecutive bits. Where Hamming error correction is used, for the control slot this costs 10 bits, for a cell it costs 16 bits. By monitoring at block 8 the errors at the head end a response message can be extracted from the errors. The error pulse the NTE causes will be 1.5 bits wide, which can cause up to 2 errors. Each bit of the NTEs response needs to be sent several times to statistically encode the information. The exact pattern of when these errors occur will give the range for the NTE. By phasing the timing of them, better accuracy can be obtained.

The pulse is 1.5 bits wide to increase the probability of causing an error. If the pulse was one bit wide it would normally cause a single bit error, but could cause a 2 bit error. As error correcting has to cater for a 2 bit error pattern, the pulse can be increased to 1.5 bits without needing an additional error correction, this improves the probability of a bit getting through.

The probability of a bit getting through depends on if it hits the guard period around each word, and whether the bits were 0 or 1. The guard period is roughly 10 bits in 42, and allowing for edge effects it is assumed that only 30 in 42 will register. This will hit at least one bit and usually 2 bits.

The probability of a bit being corrupted depends on the probability of two bits being affected P2. This is at least 50% but depending on the type of detectors used may be in the range 50% to 90%. The formula is then:

Probability_Both_Bits_in_Window+Probability_One bit_In_Window+Prob_Other_Bit $$-(3\%_{42})*(1-\tfrac{1}{2}*(1-P2)-P2*((\tfrac{1}{2})*(\tfrac{1}{2})))+(\tfrac{1}{42})(1-\tfrac{1}{2}))+(1-P2)*(\tfrac{1}{42})*(1-(\tfrac{1}{2}))$$

For P2=50% this gives 46%, for P2=70% this gives 50%, for P2=90% this gives 53%. For the analysis that follows the probability is assumed to be 50%.

Thus to get a bit through it will have to be sent several times. It is important that it is sent more than once per cell, however there are 8 separate interleaved streams, it the NTE sends the pulse suitably spaced it can send 7 pulses within the time of one cell such that no two can possibly hit the same cell. By repeating the same data bit for these 7 pulses, it will get through 127 in 128 times.

Hamming error correction is selected from one of several error-correcting codes invented by Richard Hamming which use redundant information bits to detect and correct any errors in a transmitted character.

The NTE needs to send a message format which comprises a preamble and a label. This preamble has to give the timing and range information sufficient for the head end to work out the range of the NTE and bit positions to interpret the label.

The label does not need to be very large, 3 bits is considered adequate.

The following pattern is proposed:

1 0 1 1 0 1 X X X

The preamble 101101 indicates that the message is for ranging and allows the range and bit timing to be determined. The XXX is the label. The head end will check that it receives.

1 0 1 1 0 1 X X X 0 0 0 and that is sufficient to be confident that only a single NTE is responding at once.

If two NTE's respond at the same time the overlap will be recognized.

A bit 1 is encoded as an error, a bit 0 as no errors.

With a 127 in 128 probability of getting each 1 through, and assuming that an average 1.5 of the label bits are a 1, then this will be correctly recognized at the head end roughly 96% of the time. If this is incorrect with respect to the preamble the head end will ignore it, if this is incorrect with respect to the label, the head end will try and communicate with such an NTE and get no reply, and hence no problems will be caused.

The entire response therefore takes 12 cell cycles to be recognized=94 microseconds. In practice it will take the software at the head end rather longer to perform the analysis but this does not matter.

In a simple system the range could be determined by the position of the first bit in time. However it has to be realised that there is only a 50% probability that the first pulse of the first bit will arrive.

By phasing the pattern of pulses to form each bit by the NTE the head end can extrapolate and derive the timing very accurately. If there is insufficient information, the head end can choose to ignore the response.

As an example the 7 pulses referred to above can be sent at bit 0 at bits 0, 44, 92, 144, 200, 260 and 324 which are separations of 44, 48, 52, 56, 60, 64 bits at line data rate. The separation between any two is unique and hence the position of bit 0 can be determined if no error is detected.

The pattern of pulses to form each bit will be chosen such that the time between any two errors will be different, thus pattern comprising the message can be matched to it and hence the expected position of the first error pulse and the range can be derived even if in practice the first error pulse did not occur.

Each bit of the message can be phased in the same way so there will be at least 4 patterns for the head end to check.

The head end will ask normally for any NTE, but at times of high load it may need to restrict this to one NTE at a time. After a major reconfiguration this might be quite onerous, if the head end has a record of the serial numbers it had before the reconfiguration it can simply ask each one in turn to respond. The message should have the following format:

Mask for Serial Number=32 bits

Number to be matched=32 bits

The NTE masks its serial number with the mask, and compares the result with the number to be matched. It only responds if it matches.

When an NTE initializes, it waits for an "Any New NTEs" message. There will be two forms of this, a general one and a restricted one that has to match part of the NTEs serial number. When it gets the "Any New NTEs" message it responds with a "I am here" using the Controlled error coding, the first bit of which will be a given fixed period after the "Any New NTEs" was received, this period allows for any processing necessary, this time will be subtracted from the measured time by the head end to derive the range.

The NTE selects a random 3 bit label and sends "I am here" to the head end, and waits. If it gets a response within N ms, it acts on it, otherwise it backs off for a random period and waits for a new "Any New NTEs" message.

The response it is waiting for will acknowledge the message including the label, give the NTE a stream to use and an NTE number to identify it and a delay time which it is to use. The delay time is the amount the NTE should wait after getting its framing or notification to use the upstream slots. i.e. it is derived from the range. Delay time=system loop max time−Measured delay.

Once the NTE is operating the range will be updated as part of the framing.

The head end will send "Any New NTEs" on the first stream when it is ready, it will then start a timer and wait for N ms, over that period it will look for errors on each of the streams, recording the time of single errors it has been able to correct and the presence of any multiple errors that it has failed to correct. This is passed for analysis to the processor.

When it has nothing to do the head end processor will send "Any New NTEs" and wait for errors to be reported.

If it gets errors but no multiple errors it continues this analysis. If there are less than N multiple errors it goes back to the start of its analysis, if there are more than that, it waits for an error free period then asks for a restricted "Any New NTEs".

The initial analysis can be performed by a sliding window analysis of errored cell periods, moving the window half a cell a time looking for the 1 0 1 1 0 1 X X X 0 0 0 pattern.

Once this is found the label XXX is determined and the range can be determined.

To determine the range, the first stage is to start with the '1' with the highest number of bits and try to match the expected phased profile to the data. Once the best (earliest) bit has been found, this is checked and rechecked on each of the other '1's. This should enable the range to be determined to within 2 bits, which is 3 nanoseconds at 700 Mb/s, this is sufficient to work with the 9 bit guard window of the TDMA. If there are insufficient bits or the data is not consistent as to the range, then the head end should ignore the response.

If multiple NTEs respond to the "Any New NTEs" at the same time then there will probably be some corruption that can not be corrected by the Hamming codes. Above one NTE responding this will cause some cells to be errored. For 2 NTEs responding within 8 microseconds of each other this would cause on average 7*5.5*0.25 cells to be errored beyond the error correction capability, (about 10 cells). This is the worst case, with a variation above 8 microseconds (2 km), the errors would be less. Under normal operation and installation it is considered unlikely that 2 NTEs would want to range at the same time.

By appropriate choice of error protection, the "I am here" message should be visible even on a quiet system with no traffic.

If many NTEs need to be quickly re-ranged this is quite quick if each NTE in turn is asked explicitly to respond with a range. Every single NTE should be re-ranged within a second.

Using these methods, the "I am here" message can be passed across the data streams without affecting the data and also enable the range to be accurately determined.

What is claimed is:

1. In a telecommunications time division multiple access (TDMA) optic network system, a method of enabling network termination equipments (NTEs) to communicate with a head end comprising the steps of: encoding at an NTE a system message including error correction as a slow speed signal on existing network signal traffic; monitoring errors on the encoded system message at the head end; and extracting the encoded system message from the errors.

2. A method of communication as claimed in claim 1, wherein the signal contains a pattern comprising a common preamble and a label for the NTE.

3. A method of communication as claimed in claim 1, wherein an error pulse caused by the NTE transmitting is 1.5 bits wide.

4. A method of communication as claimed in claim 1, wherein each bit of the system message is encoded a plurality of times.

5. A method of communication as claimed in claim 4, wherein the signal contains a pattern comprising a common preamble and a label for the NTE, including deriving the pattern from the phasing of the bits of the received message and hence determining the exact time of the first pulse and hence the range of the NTE.

6. A method of communication as claimed in claim 1, wherein the system message has a format comprising a preamble which provides the timing and range information for the head end and a label enables the head end to provide a response identified by an original transmitting NTE.

* * * * *